United States Patent [19]

Southoff

[11] Patent Number: 4,777,723

[45] Date of Patent: Oct. 18, 1988

[54] ABRASIVE PIPE SAW

[76] Inventor: Herbert C. Southoff, P.O. Box 791, Kaslo, Canada

[21] Appl. No.: 138,834

[22] Filed: Dec. 28, 1987

[30] Foreign Application Priority Data

Oct. 5, 1987 [CA] Canada .................................. 548639

[51] Int. Cl.$^4$ .............................................. B23B 5/04
[52] U.S. Cl. ......................................... 30/97; 30/101; 51/241 S; 82/72; 82/84; 82/101
[58] Field of Search ...................... 30/96, 97, 101, 102; 51/241 S; 82/70.2, 71–77, 84, 101

[56] References Cited

U.S. PATENT DOCUMENTS 2,842,238  7/1958  Shaw et al. ...................... 30/97 X
4,138,911  2/1979  Namigushi ........................... 82/72

Primary Examiner—Douglas D. Watts
Attorney, Agent, or Firm—George H. Dunsmuir

[57] ABSTRACT

A portable pipe cutter primarily intended for concrete lined pipe includes a pair of annular tracks, which are mounted in fixed, parallel relationship to each other on a pipe, a pair of rectangular plates carrying rollers for movably mounting the plates on the tracks on opposite sides of a pipe to be cut, springs resiliently interconnecting the ends of the plates, a counterweight on one plate, a rotary cutter on the other plate with a blade outside of the plate, and a tension device for adjusting the tension on the blade so that actuation of the cutter causes the device to travel around the pipe while making a cut dependent on tension on the cutter.

8 Claims, 2 Drawing Sheets

ABRASIVE PIPE SAW

BACKGROUND OF THE INVENTION

This invention relates to a pipe cutter, and in particular to a portable pipe cutter.

While the invention was specifically designed for cutting cement lined metal pipe, it will be appreciated that the pipe cutter can be used to cut pipes formed of virtually any conventional material.

Cement lined pipe has been in use for over twenty years in such areas as salt water injection lines and miscible flood systems in oil fields, and in municipal water systems. Such pipe is produced in diameters ranging from two to forty-two inches. The pipe is formed of a steel shell with a spun mortar liner. It is essential that pipe ends be cut accurately, so that welding can be effected with a minimum of damage to the cement.

Portable pipe cutters are disclosed, for example by Canadian Pat. No. 531,520, which issued to O. B. Harmes on Oct. 9, 1956, and U.S. Pat. Nos. 3,942,248, issued to C. R. Sherer et al on Mar. 9, 1976 and 4,213,357, issued to S. A. Lively et al on July 22, 1980. Devices currently available for cutting cement lined pipe include hand held grinders, the Wachs pipe guillotine saw, a milling machine, and a hand operated gas power saw. The hand held grinder was used in the early days of working with cement lined pipe as the only device for making a cut through the pipe. The process was slow, tedious and difficult, and accuracy was virtually impossible to achieve. The Wachs saw is manufactured by E. H. Wach Co., Wheeling, Ill., U.S.A. and consists of a powered, metal blade hack saw. The life of the blade is quite limited, and consequently the device is slow and expensive. The milling machine will cut and bevel a pipe accurately in a single operation by means of milling cutters formed of tungsten carbide. The life of the cutters is also quite limited. The gas power saw is similar in some respects to a chain saw used to cut wood. Cuts can be made relatively quickly, but are not sufficiently accurate for welding purposes. The pipe ends must be cleaned using a hand grinder, and consequently the entire cutting operation is somewhat lengthy.

The object of the present invention is to overcome the problems described above by providing a relatively simple pipe cutter, which facilitates accurate cutting of cement lined and other pipe, in any position from the horizontal to the vertical.

SUMMARY OF THE INVENTION

Accordingly, the present invention relates to a portable pipe cutter comprising a pair of track means for mounting in parallel, spaced apart relationship to each other on a pipe to be cut; carriage means movably mounted on said track means; rotary cutter means carried by said carriage means outside of one said track means for cutting into the pipe; and tension means for adjusting the tension of said cutter means on the pipe, whereby rotation of the cutter means causes the latter to move around the pipe on said track means and effect cutting of the pipe to a depth dependent upon the tension on said cutter means.

BRIEF DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENTS

Figure 1:
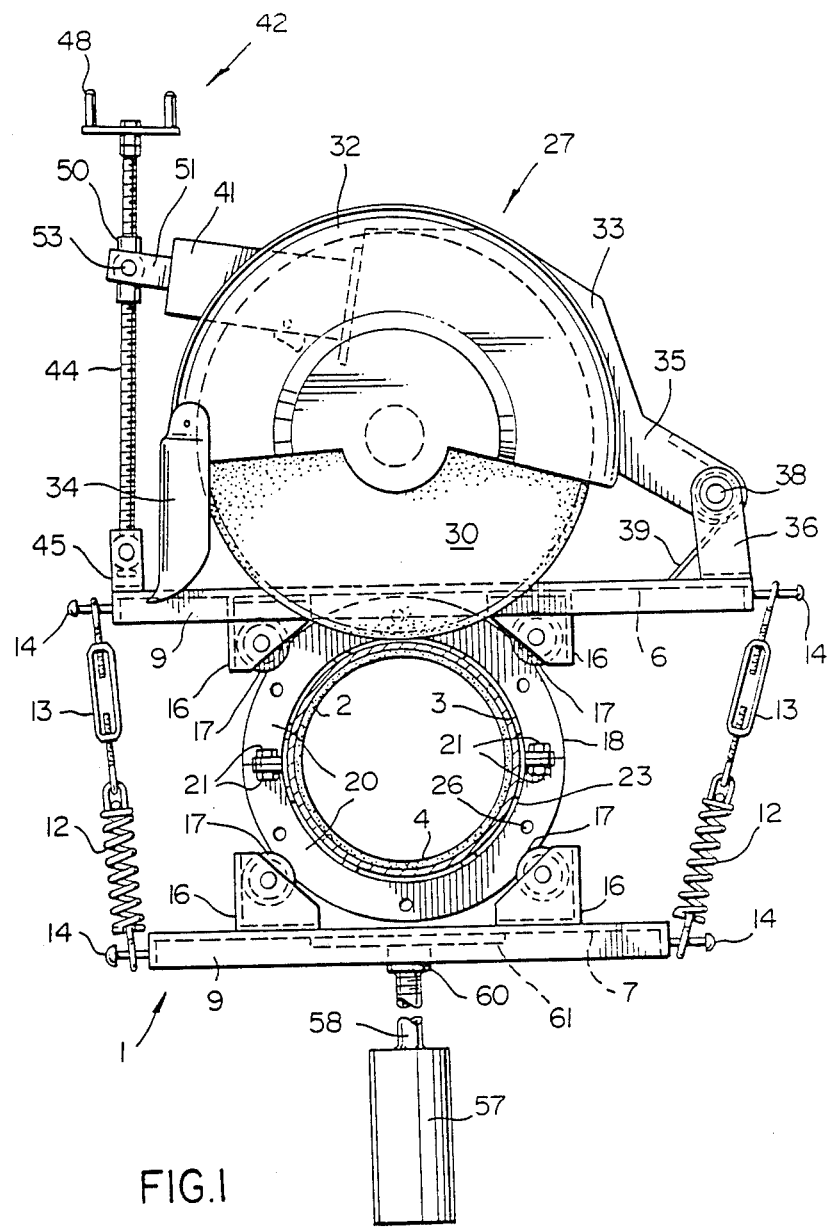
FIG. 1 is a front elevation view of a pipe cutter in accordance with the present invention mounted on a pipe.

With reference to the drawings, the pipe cutter of the present invention includes a frame generally indicated at 1 for mounting on a pipe 2 to be cut. The pipe 2 includes a metal shell 3 and a concrete liner 4. The frame 1 is defined by a pair of parallel plates 6 and 7 for mounting on opposite sides of the pipe 2. Flanges 9 and 10 extend downwardly from the sides and ends, respectively of the plates 6 and 7 for strengthening the frame.

Each corner of the plate 6 is connected to a corresponding corner of the plate 7 by a helical spring 12 and a turnbuckle 13. The spring 12 and the turnbuckle 13 are interconnected end to end, and these elements are connected to the plates 6 and 7, by pins 14 (FIG. 1) extending outwardly from each corner of each plate 6 and 7.

Four generally triangular brackets 16 are provided on each plate 6 and 7 for supporting rollers 17. The brackets 16 on the top plate extend and open downwardly, and the brackets 16 on the bottom plate 7 extend and open upwardly. The rollers 17 ride on a pair of parallel tracks 18, each of which is defined by a split ring, the two halves 20 of which are held together by nuts and bolts 21 extending through aligned lugs 22 extending outwardly from each side of each half 20.

The tracks 18 are spaced from the pipe 2 by annular steel spacers 23. The tracks 18 are maintained in parallel, spaced apart relationship by threaded rods 24 and nuts 25. The threaded rods extend through holes 26 (FIG. 1) in the tracks 18, and through the nuts 25 on each side of each track 18.

A rotary cutter generally indicated at 27 is mounted on the top plate 6. The cutter 27 includes an electric motor 29 for a blade 30 defined by a grinding or cutter wheel mounted on the shaft of the motor 29 in a blade guard 32, which is connected to the saw casing 33. A safety blade cover 34 is provided on one side of the cover 32.

Figure 2:
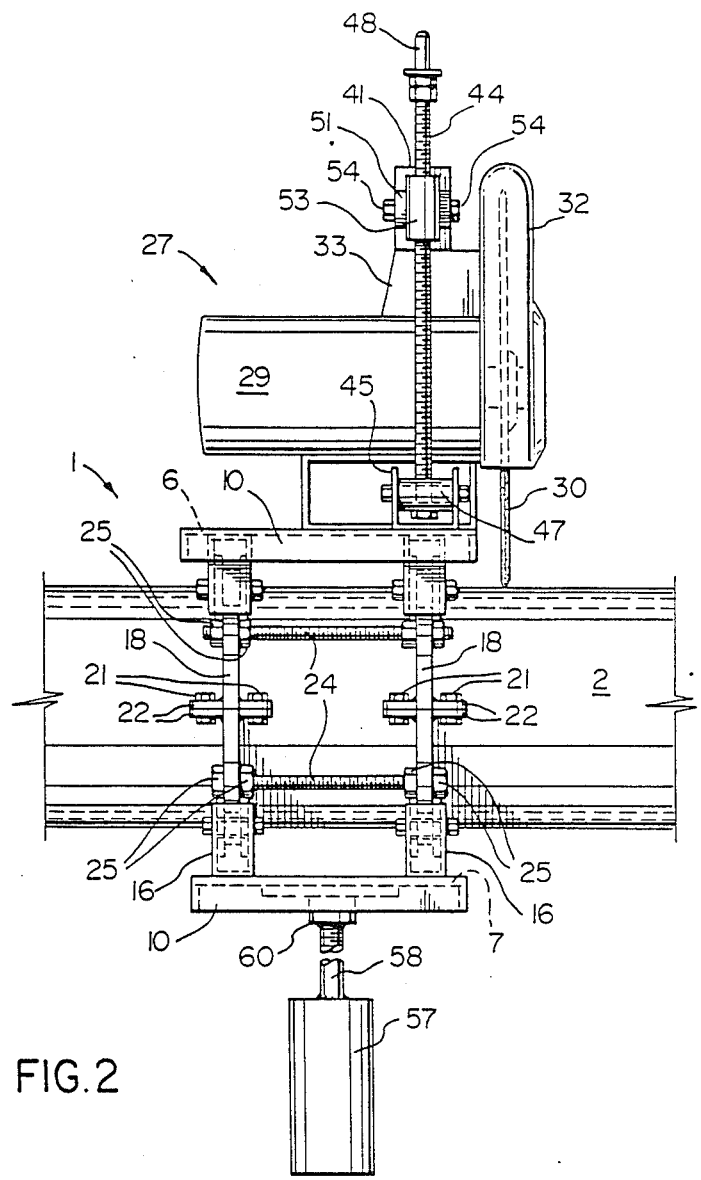
FIG. 2 is a side elevation view of the pipe cutter of FIG. 1, with parts omitted.

An arm 35 extends outwardly from one side of the casing 33 for pivotally connecting saw casing 33 to a generally U-shaped bracket 36 mounted on one end of the top plate 6 near one side thereof, so that the blade 30 is located outside of the frame 1. The arm 35 is connected to the bracket 36 by a pin 38. A spring 39 biases the arm 35, and consequently the cutter 27 upwardly. A second arm 41 extends outwardly from the other side of the casing 33 to a tension control device generally indicated at 42. The control device 42 includes a threaded rod 44, the bottom end of which is pivotally mounted in a U-shaped bracket 45. The bottom end of the rod 44 extends through a sleeve 47 (FIG. 2), which is mounted in the bracket 45 for rotation with the rod 44. A handle 48 is provided on the top end of the rod 44 for rotating the latter. An internally threaded sleeve 50 is movably mounted on the rod 44. The sleeve 50 is connected to the arm 41 by a clevis 51, radially extending pins 53 (one shown) and nuts 54 on the ends of such pins.

A cylindrical counterweight 57 extends downwardly from the center of the bottom plate 7. The counterweight 57 is connected to the plate 7 by a rod 58 with a threaded top end for extending into a nut 60 welded to a plate 61 on the bottom plate 7.

In use, the tracks 18 are placed on a pipe 2 to be cut Obviously, in order to mount the tracks 18 on the pipe 2, the split rings defining the tracks must be open, and one pair of springs 12 or turnbuckles 13 must be disconnected from each other or from the plate 6 or 7, i.e. the frame 1 must be open. The tracks 18 are arranged in parallel relationship to each other, adjustments being made by means of the threaded rods 24, and the nuts and bolts 21 tightened to secure the tracks in place.

Thus, the carriage defined by the frame 1 is mounted on the pipe 2 with the blade 30 cantilevered beyond one side 9 of the top plate 6 in cutting position above the pipe 2.

The handle 48 of the tension rod 44 is turned to move the blade 30 into contact with the pipe 2. When the motor 29 is started to rotate the blade 30, the frame 1 and the cutter 27 travel around the pipe 2 to make a straight cut the depth of which is dictated by the tension of the rod 44 on the end of the plate 6. By incrementally tightening the tension on the blade 30, the pipe 2 is entirely cut through.

Thus, there has been described a structurally simple pipe cutter, which is easy to use and which ensures an accurate, straight cut.

While the foregoing description states that the frame 1 is opened to mount the pipe cutter on a pipe, it will be appreciated that the cutter can be partially opened or loosened and slid onto the end of a pipe section to be cut.

What I claim is:

1. A portable pipe cutter comprising a pair of track means for mounting in parallel, spaced apart relationship to each other on a pipe to be cut; carriage means movably mounted on said track means; rotary cutter means carried by said carriage means outside of one said track means for cutting into the pipe; and tension means for adjusting the tension of said cutter means on the pipe, whereby rotation of the cutter means causes the latter to move around the pipe on said track means and effect cutting of the pipe to a depth dependent upon the tension on said cutter means.

2. A pipe cutter according to claim 1, wherein said carriage means includes first plate means for carrying said cutter means; and second plate means connected to said first plate means for mounting on a side of the pipe opposite to said first plate means.

3. A pipe cutter according to claim 2, including roller means on each said plate means for movably mounting said carriage means on said track means.

4. A pipe cutter according to claim 3, including first spring means connecting said first plate means to said second plate means for maintaining said first and second plate means substantially parallel to each other.

5. A pipe cutter according to claim 4, including turnbuckle means connecting said first spring means to one said plate means, whereby the tension on said first and second plate means exerted by said first spring means can be adjusted.

6. A pipe cutter according to claim 4, wherein said tension means includes pivot means pivotally connecting one side of said cutter means to said first plate means; and threaded rod means adjustably connecting the other side of said cutter means to said first plate means, whereby rotation of said rod means causes an adjustment of the tension of said cutter means on the pipe.

7. A pipe cutter according to claim 6, including second spring means biasing said cutter means away from the pipe, whereby said rod means can be used for accurate setting of cutter means tension.

8. A pipe cutter according to claim 3, including counterweight means on said second plate means for balancing the cutter on a pipe

* * * * *